(12) United States Patent
Horiuchi

(10) Patent No.: US 8,767,884 B2
(45) Date of Patent: Jul. 1, 2014

(54) RECEIVER

(75) Inventor: Kazuhisa Horiuchi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 339 days.

(21) Appl. No.: 13/230,012

(22) Filed: Sep. 12, 2011

(65) Prior Publication Data

US 2012/0236974 A1   Sep. 20, 2012

(30) Foreign Application Priority Data

Mar. 14, 2011   (JP) .................................. 2011-054962

(51) Int. Cl.
*H04L 1/00* (2006.01)
*H04B 1/10* (2006.01)

(52) U.S. Cl.
USPC .......................... 375/340; 375/346; 455/226.1

(58) Field of Classification Search
USPC ......... 375/224, 226, 316, 326, 340, 344, 354, 375/362, 346; 455/214, 226.1, 334, 336
See application file for complete search history.

(56) References Cited

U.S. PATENT DOCUMENTS 6,456,660 B1 *   9/2002   Yokoyama ............... 375/240.16
2009/0296586 A1   12/2009   Horiuchi
2012/0047413 A1 *   2/2012   Chung ......................... 714/731

FOREIGN PATENT DOCUMENTS

| JP | 06-205066 | 7/1994 |
|----|-----------|--------|
| JP | 07-297859 | 11/1995 |
| JP | 2007-243504 | 9/2007 |
| JP | 2008-109300 | 5/2008 |
| JP | 2008-131364 | 6/2008 |

* cited by examiner

*Primary Examiner* — Young T. Tse
(74) *Attorney, Agent, or Firm* — White & Case LLP

(57) ABSTRACT

According to one embodiment, a receiver includes an EVM calculating unit which calculates an EVM (Error Vector Magnitude) value of an input signal. Further, a receiver includes a control unit which determines whether the frequency of EVM calculation is reduced or not, according to a comparison between the EVM value and a predetermined range including a threshold for switching processing by the EVM value. Further, a receiver includes a data reducing unit which controls the calculation interval of the EVM value in the EVM calculating unit, according to the determination result by the control unit.

20 Claims, 6 Drawing Sheets

100a RECEIVER
101a EVM CALCULATING UNIT
102a CONTROL UNIT
103 DATA REDUCING UNIT
201a CLOCK CONTROL DETERMINING UNIT
202a CLOCK CONTROL SIGNAL CREATING UNIT
203 CLOCK CONTROL UNIT
401 ROOT MEAN SQUARE CALCULATING UNIT
402 THRESHOLD DETERMINING UNIT

100 RECEIVER
101 EVM CALCULATING UNIT
102 CONTROL UNIT
103 DATA REDUCING UNIT
201 CLOCK CONTROL DETERMINING UNIT
202 CLOCK CONTROL SIGNAL CREATING UNIT
203 CLOCK CONTROL UNIT

100a RECEIVER
101a EVM CALCULATING UNIT
102a CONTROL UNIT
103 DATA REDUCING UNIT
201a CLOCK CONTROL DETERMINING UNIT
202a CLOCK CONTROL SIGNAL CREATING UNIT
203 CLOCK CONTROL UNIT
401 ROOT MEAN SQUARE CALCULATING UNIT
402 THRESHOLD DETERMINING UNIT

RECEIVER

CROSS-REFERENCE TO RELATED APPLICATIONS

This application is based upon and claims the benefit of priority from the prior Japanese Patent Application No. 2011-054962, filed on Mar. 14, 2011; the entire contents of which are incorporated herein by reference.

FIELD

Embodiments described herein relate generally to a receiver.

BACKGROUND

Conventionally, there have been disclosed many techniques for properly switching processing by using EVM (Error Vector Magnitude) value as index and making a comparison between the EVM and a certain threshold. According to these techniques, an EVM value or an average value of EVMs of symbols in a certain period is always monitored, hence to select processing.

DETAILED DESCRIPTION

In general, according to one embodiment, a receiver includes an EVM calculating unit which calculates an EVM (Error Vector Magnitude) value on an input signal. Further, the receiver includes a control unit which determines whether the frequency of EVM calculation is reduced or not by comparison between the EVM value and a predetermined range including a threshold for switching processing according to the EVM value. Further, the receiver includes a data reducing unit which controls the calculation interval of the EVM values in the EVM calculating unit, according to the determination of the control unit.

Exemplary embodiments of a receiver will be explained below in detail with reference to the accompanying drawings. The present invention is not limited to the following embodiments.

First Embodiment

Figure 1:
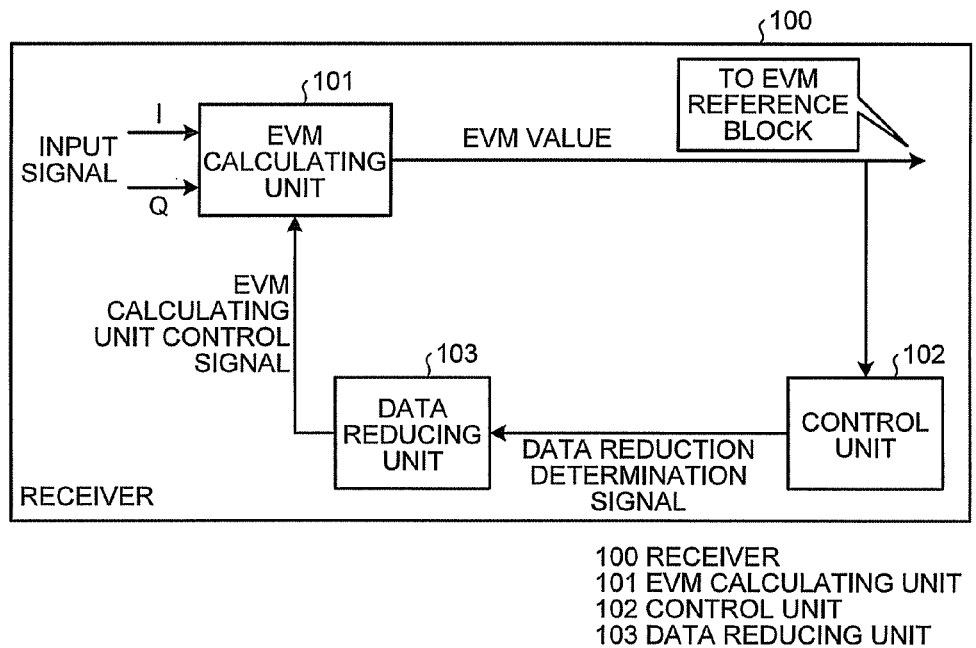
FIG. 1 is a block diagram illustrating the structure example of a receiver according to a first embodiment.

FIG. 1 is a block diagram illustrating the structure example of a receiver according to a first embodiment. A receiver 100 includes an EVM calculating unit 101, a control unit 102, and a data reducing unit 103. The EVM calculating unit 101 receives an input signal I/Q, calculates an EVM value, and supplies it. The control unit 102 determines whether data targeted for EVM calculation by the EVM calculating unit 101 is reduced nor not (whether the frequency of calculation is reduced or not), according to the EVM value calculated by the EVM calculating unit 101. The data reducing unit 103 creates a signal for reducing the data targeted for EVM calculation by the EVM calculating unit 101 and supplies the same signal, according to the determination by the control unit 102.

Here, a method of calculating an EVM value in the EVM calculating unit 101 can be expressed by the following equation (1).

$$EVM = \frac{\sum_{n=1}^{N}\{(I_n - I_0)^2 + (Q_n - Q_0)^2\}}{N * P_0} \quad (1)$$

In the equation (1), the reference signs $I_n$ and $Q_n$ indicate the obtained constellation points and $I_0$ and $Q_0$ indicate the ideal constellation points. The reference sign N indicates the number of data bits, and the reference sign $P_0$ indicates the average power of constellation. The above method is the same as the conventional calculation method.

Next, the operation of the receiver 100 will be described. The EVM calculating unit 101 calculates an EVM value on the data of the obtained input signal according to a control signal from the data reducing unit 103 and supplies the calculated EVM value to an EVM reference block not illustrated and the control unit 102. The EVM reference block is a block for performing a switching operation of the processing according to an EVM value. Specifically, the EVM reference block includes a block for changing a modulation method and an encoding method, a block for selecting an error correction, and the like according to an EVM value. These reference blocks may be formed in the conventional structure and are not intended to limit the processing contents.

Next, the control unit 102 receives an EVM value from the EVM calculating unit 101 and by comparison between the EVM value and a threshold, it determines whether or not the data targeted for EVM calculation by the EVM calculating unit 101 is reduced and the frequency of EVM calculation is reduced.

Figure 2:
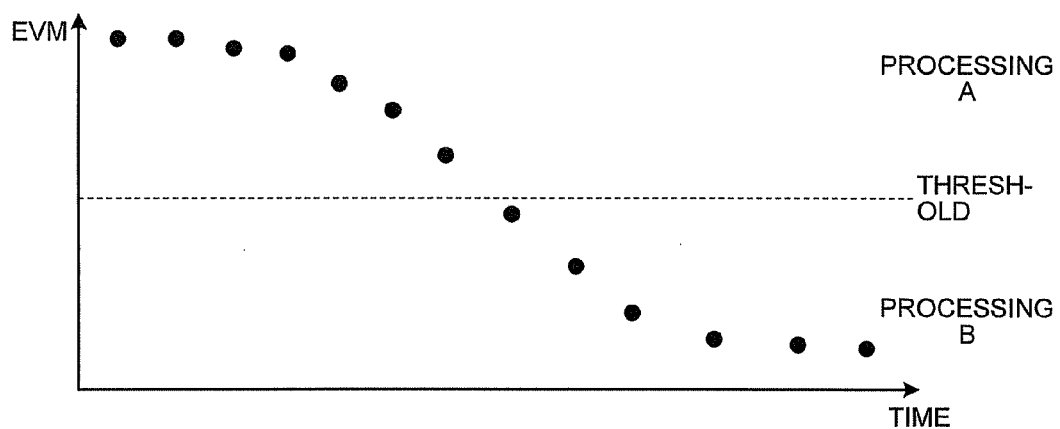
FIG. 2 is a view illustrating a relation between EVM values when data is not reduced and switching of processing.

A method for reducing the data for EVM calculation will be described. FIG. 2 is a view illustrating a relation between the EVM value when the data is not reduced and the switching of the processing. A horizontal axis indicates a time and a vertical axis indicates an EVM value. When the EVM value is a threshold and more, the processing A is performed, and when the EVM value is less than the threshold, the processing B is performed. Switching of the processing includes a change of modulation method in the EVM reference block as mentioned above, but it is not intended to restrict the contents of the processing.

In FIG. 2, the EVM calculating unit 101 regularly obtains data without deleting any data and calculates each EVM value about the obtained data. Here, the intervals of the EVM calculation are constant. In the EVM reference block, whether to perform the processing A or the processing B is determined according to the respective EVM values. As mentioned above, a timing of going through the threshold (a timing of switching the processing A to the processing B in FIG. 2) can be accurately grasped in the EVM reference block as far as the EVM values are calculated constantly at predetermined intervals without reduce the data. On the other hand, since the EVM calculating unit 101 constantly calculates the EVM values, power consumption for calculation increases.

There is a method of reducing the frequency of EVM calculation by reducing (thinning out) the data, in order to reduce the power consumption for calculation. When receiving data of an input signal, the EVM calculating unit 101 calculates the EVM value. While when receiving no data, it does not calculate any EVM value, which means reduction of calculation for so much and reduces the power consumption.

Figure 3:
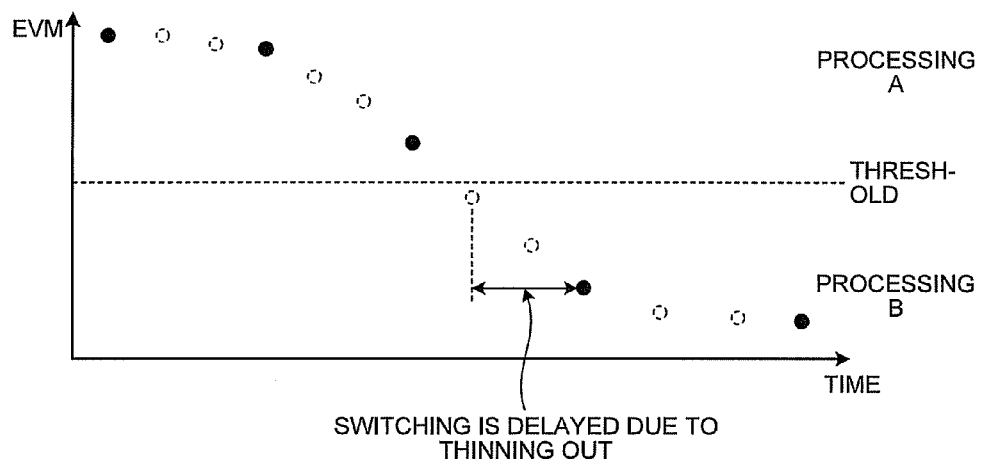
FIG. 3 is a view illustrating a relation between EVM values when data is regularly reduced and switching of processing.

FIG. 3 is s view illustrating a relation between the EVM values when data is regularly reduced and the switching of the processing. FIG. 3 illustrates that the EVM calculating unit 101 calculates an EVM value in the case of a black circle and that it does not calculate any EVM value in the case of a dotted circle. By comparison with FIG. 2, the data is thinned out to ⅓ with two data samples simply reduced from every three and the frequency of EVM calculation in the EVM calculating unit 101 becomes ⅓. The calculation intervals are constant but longer than the normal calculation intervals illustrated in FIG. 2 (when date is not thinned out).

As mentioned above, by reducing the frequency of EVM calculation, the EVM calculating unit 101 can reduce the power consumption for calculation. However, as illustrated in FIG. 3, a timing of detecting the date less than the threshold is delayed compared with the constant EVM calculation (FIG. 2) (in FIG. 3, it is delayed by 2 timing). This deteriorates the accuracy of the EVM calculation, and in the EVM reference block, a timing of switching from the processing A to the processing B is delayed, which may cause a trouble in some application.

According to the embodiment, the control unit 102 does not reduce the data for EVM calculation when the EVM value is in the vicinity of the threshold and when the EVM value is away from the threshold, it determines to reduce the data.

There are many methods of using the EVM value in the field of communication; with inclination to increase the data amount in the recent wireless communication method (IEEE802.11n, WiMAX, and the like). Consequently, the number of necessary registers is increased in the EVM calculation and the constant EVM calculation increases the power consumption. In the case of reducing the calculation frequency, simply data thinning out deteriorates the accuracy in selecting the processing based on the EVM values. Here, since the EVM has a feature that its bad values are not fluctuated largely, all the data does not have to be calculated with the fluctuation thereof restrained. Using this feature, the data is thinned out in a portion where the EVM values are supposed to be little fluctuated; otherwise, normal calculation is performed. According to this, it is possible to restrain the deterioration in calculation accuracy and to save the power consumption.

Figure 4:
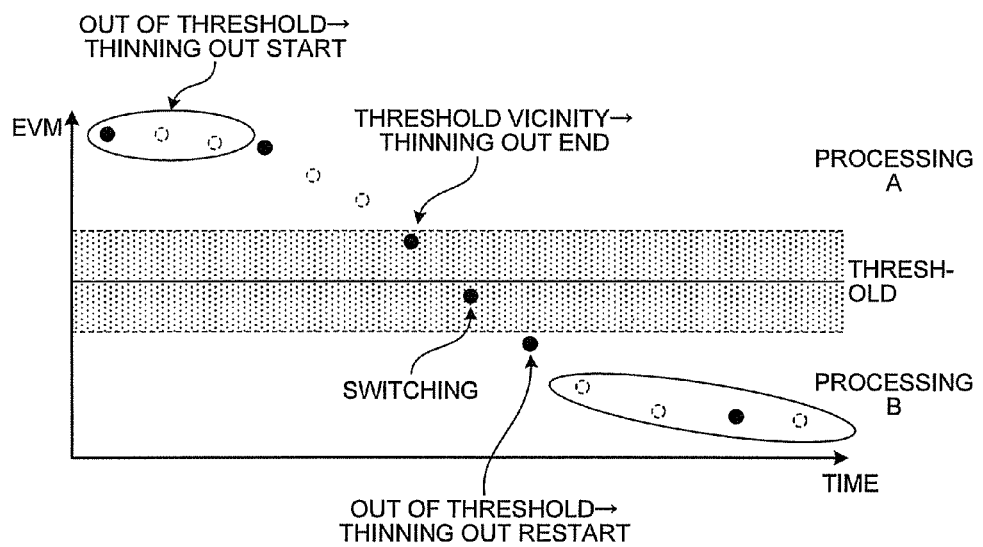
FIG. 4 is a view for use in describing the determination in a control unit of the first embodiment.

FIG. 4 is a view for use in describing the determination in the control unit 102 of the embodiment. Differently from FIGS. 2 and 3, a predetermined range is set vertically around a threshold. When an EVM value is out of the threshold vicinity (the predetermined range), the control unit 102 determines to thin out (reduce) the data, similarly to FIG. 3, supposing that the EVM value to be calculated next does not cover the threshold (not less than the threshold, in FIG. 4) even when thinning out the data to the next EVM calculation.

On the other hand, when an EVM value is in the vicinity of the threshold (within the predetermined range), the control unit 102 determines not to thin out (reduce) the data, similarly to FIG. 2, supposing that the next EVM value may cover the threshold (less than the threshold, in FIG. 4). As illustrated in FIG. 4, when the EVM value becomes the threshold or less and it further gets down the threshold vicinity (the predetermined range) with elapse of time, the control unit 102 determines to thin out (reduce) the data, similarly to FIG. 3, supposing that the next EVM value to be calculated dose not cover the threshold (not the threshold or more, in FIG. 4) even when thinning out the data to the next EVM calculation. The control unit 102 supplies the determination result to the data reducing unit 103 as a data reduction determination signal.

The data reducing unit 103 creates an EVM calculating unit control signal for reducing the data targeted for calculation and supplies the above signal to the EVM calculating unit 101, according to the data reduction determination signal from the control unit 102.

According to the EVM calculating unit control signal from the data reducing unit 103, the EVM calculating unit 101 reduces the data targeted for calculation or does not reduce any data and calculates the EVM value as for the corresponding data of the obtained input signal. As mentioned above, the EVM calculating unit 101 calculates EVM values while reducing data according to the states of the corresponding EVM values (states of transmission channels) and accordingly, the calculation intervals vary depending on the respective EVM values.

When the EVM calculating unit 101 calculates an EVM value, the data to be used may be the EVM of single data or may be the average value of the EVM values of several data. The EVM calculating unit 101 may be the same circuit as the conventional one because the EVM calculation itself is the same as ever and it does not have to be a special circuit unless there is a special reason for requiring a high accuracy.

In FIG. 4, although the predetermined range meaning as the vicinity of the threshold is defined as a range with the same spaces spread vertically around the threshold, it is not restricted to this but the upper range space on the threshold may be different from the lower range space under the threshold.

Although the description has been made in the case of one threshold, it is not restricted to this. For example, it may be applied to the case where two thresholds may be used to switch among three types of processing and further three and more thresholds can be used similarly.

As described hereinabove, according to the embodiment, when the calculated EVM value is out of the predetermined range including the threshold, the control unit 102 determines to calculate the next EVM value while reducing the data, while when the calculated EVM value is within the predetermined range including the threshold, it determines to calculate the next EVM value without reducing any data. According to the determination, the EVM calculating unit 101 calculates the EVM value on the data being obtained and does not calculate any EVM value on the data being reduced. According to this, the receiver can reduce the power consumption for EVM calculation without delay in switching the processing based on the EVM value.

Second Embodiment

In this embodiment, the operation will be described according to the specific structure example of the receiver 100. A different portion from the first embodiment will be described.

Figure 5:
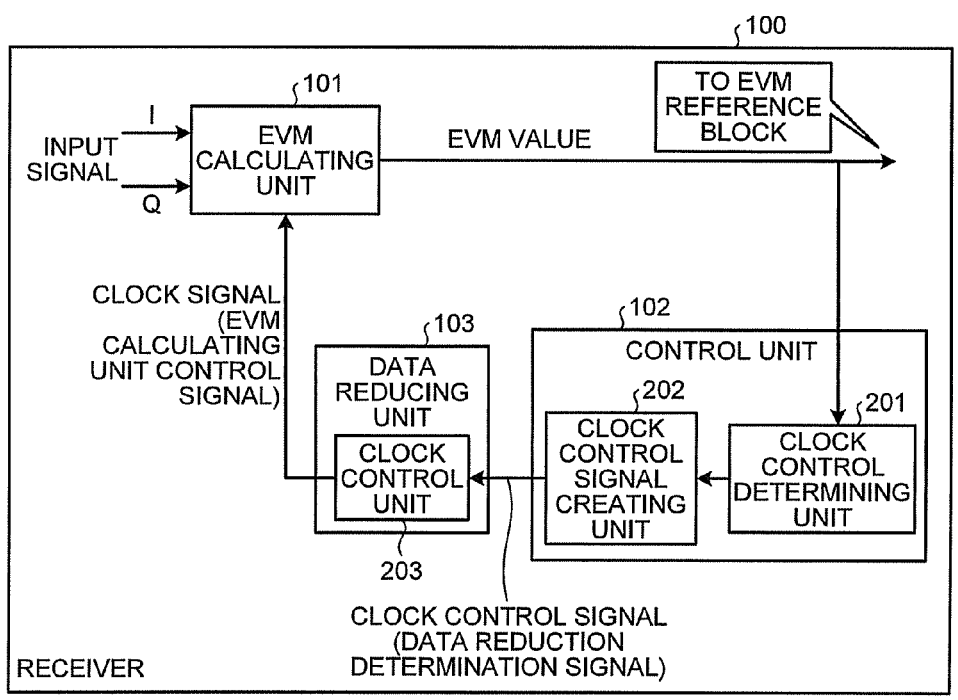
FIG. 5 is a block diagram illustrating the structure example of a receiver according to a second embodiment.

FIG. 5 is a block diagram illustrating the structure of a receiver according to a second embodiment. The control unit 102 includes a clock control determining unit 201 and a clock control signal creating unit 202. The data reducing unit 103 includes a clock control unit 203 for realizing the function of reduction.

The clock control determining unit 201 determines whether the frequency of EVM calculation is reduced or not according to the EVM value calculated by the EVM calculating unit 101 and controls a clock on the EVM calculating unit 101. As described in the first embodiment, the clock control determining unit 201 does not reduce any data when the EVM value is in the vicinity of the threshold, while when the EVM value is not in the vicinity of the threshold, it reduces the data, hence to improve the performance deterioration caused by the simple thinning out and to save the power consumption compared with the sampling of the whole points.

According to the result determined by the clock control determining unit 201, the clock control signal creating unit 202 creates a clock control signal as a data reduction determination signal. As the created signal, whatever signal (pulse, level, and the like) will do as far as it can perform a clock control. The clock control signal creating unit 202 supplies the created clock control signal (data reduction determination signal) to the clock control unit 203.

The clock control unit 203 controls a clock to be supplied to the EVM calculating unit 101, according to the clock control signal from the clock control signal creating unit 202. Specifically, it controls clock dividing and gating. The clock control unit 203 creates a clock signal (EVM calculating unit control signal) for controlling a clock, according to the clock control signal and supplies this to the EVM calculating unit 101.

The EVM calculating unit 101 calculates the EVM at a timing indicated by the clock signal, according to the clock signal (EVM calculating unit control signal) from the clock control unit 203. Thus, through the proper intermittent operation depending on the state of the EVM value, the EVM calculating unit 101 can reduce the operation time and frequency, thereby saving the power consumption.

The clock control determining unit 201, the clock control signal creating unit 202, and the clock control unit 203 are the general components of a receiver; therefore, the receiver 100 illustrated in FIG. 5 can be realized easily. The calculation of an EVM value can be expressed by FIG. 4, similarly to the first embodiment.

Although a clock control (dividing and gating) is used to reduce the data in the embodiment, it is not restricted to this but any other method may be used as far as it can obtain the same effect.

As set forth hereinabove, according to this embodiment, a specific operation of the receiver is to control a clock for the EVM calculating unit 101 and to control the frequency of EVM calculation. According to this, a receiver having the general structure can realize the EVM calculation with low power consumption.

Third Embodiment

In this embodiment, data reduction is controlled by using the root mean square (RMS) in addition to the EVM. A portion different from the first and second embodiments will be described.

Figure 6:
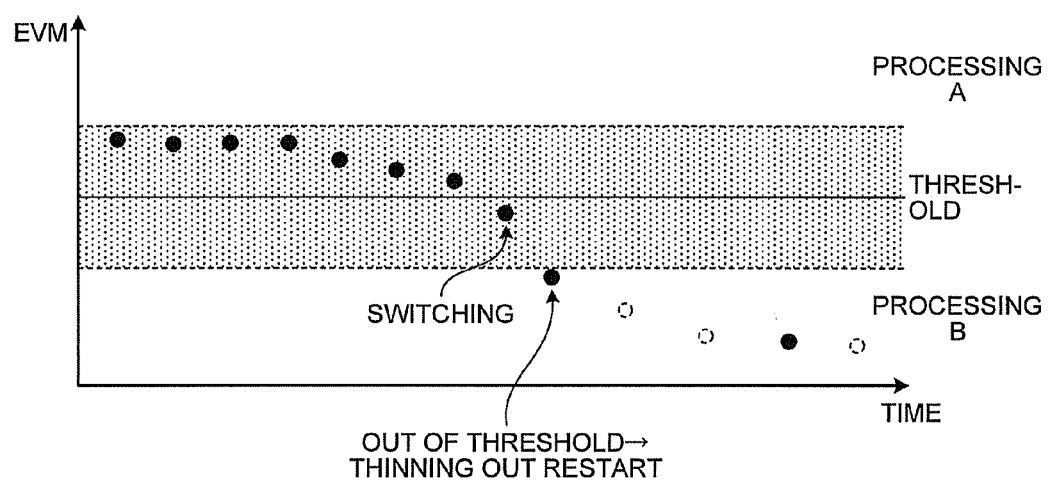
FIG. 6 is a view illustrating the EVM calculation in the receiver according to the first and the second embodiment.

At first, calculation of EVM in the receiver 100 according to the first and second embodiments will be described. FIG. 6 is a view illustrating the EVM calculation in the receiver 100 according to the first and second embodiments. The receiver 100 performs the EVM calculation while thinning out the data when an EVM value is out of a predetermined range around a threshold. However, as illustrated in FIG. 6, when the EVM value is shifted stably within the predetermined range around the threshold, a possibility of covering the threshold (less than the threshold, in FIG. 6) is regarded low; nevertheless, the receiver 100 cannot thin out the data to perform the EVM calculation in this case. Therefore, in this embodiment, in addition to the EVM value, the root mean square is used to control the data reduction.

Figure 7:
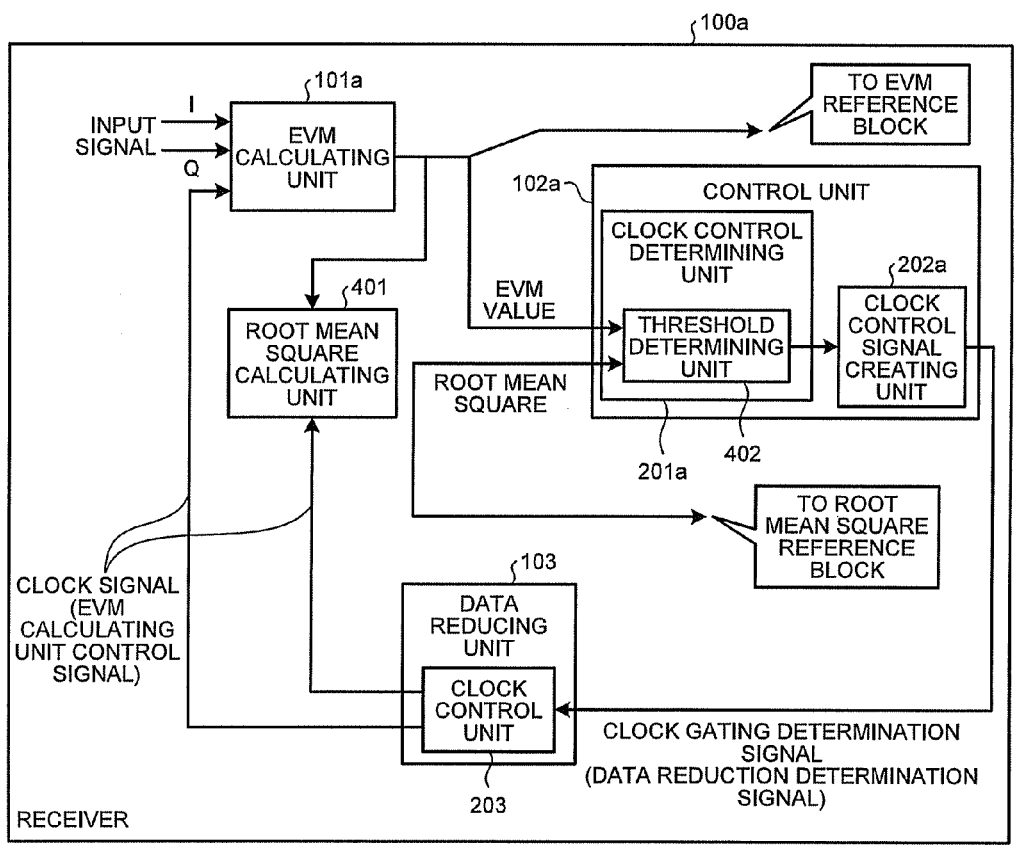
FIG. 7 is a block diagram illustrating the structure example of a receiver according to a third embodiment.

FIG. 7 is a block diagram illustrating the structure example of a receiver 100a according to this embodiment. The receiver 100a includes an EVM calculating unit 101a, a root mean square calculating unit 401, a control unit 102a, and a data reducing unit 103. Further, the control unit 102a includes a clock control determining unit 201a and a clock control signal creating unit 202a, and the clock control determining unit 201a further includes a threshold determining unit 402.

The EVM calculating unit 101a receives an input signal I/Q, calculates the EVM value, and supplies it. Here, it supplies the EVM value not only to an EVM reference block and the control unit 102a but also to the root mean square calculating unit 401. The root mean square calculating unit 401 calculates the root mean square from the input EVM value. The control unit 102a determines whether the data targeted for EVM calculation by the EVM calculating unit 101a is reduced or not, according to the EVM value calculated by the EVM calculating unit 101a and the root mean square calculated by the root mean square calculating unit 401. In the clock control determining unit 201a, the threshold determining unit 402 determines whether a clock control is performed or not, according to the input EVM value and root mean square. The clock control signal creating unit 202a creates a clock gating determination signal as the data reduction determination signal, according to the determination by the clock control determining unit 201a.

Next, the operation of the receiver 100a will be described. At first, the EVM calculating unit 101a calculates an EVM value on the data of the obtained input signal according to the clock signal from the data reducing unit 103 and supplies the calculated EVM value to the EVM reference block, the control unit 102a, and the root mean square calculating unit 401.

The root mean square calculating unit 401 calculates the root mean square from the obtained EVM value. Here, the root mean square is defined by the following equation (2).

$$x_{rms} = \sqrt{\frac{1}{N}\sum_{i=1}^{N} x_i^2} = \sqrt{\frac{x_1^2 + x_2^2 + \ldots + x_N^2}{N}} \tag{2}$$

Since the contents of the square root in the equation (2) have been already calculated by the EVM calculating unit 101a, the root mean square calculating unit 401 has only to calculate the square root by use of this value. Further, in the EVM calculation, when a calculation is performed with the base 2 used as a logarithm, a shift operation can be substituted for the square root calculation. In this case, since the calculation in the root mean square calculating unit 401 actually becomes the shift operation, this unit can be mounted without much effect on the area size.

In the clock control determining unit 201a, the threshold determining unit 402 refers to not only the EVM value but also the root mean square value, hence to thin out the data not only at the vicinity of the threshold but also at the EVM point where accuracy not so deteriorated.

Figure 8:
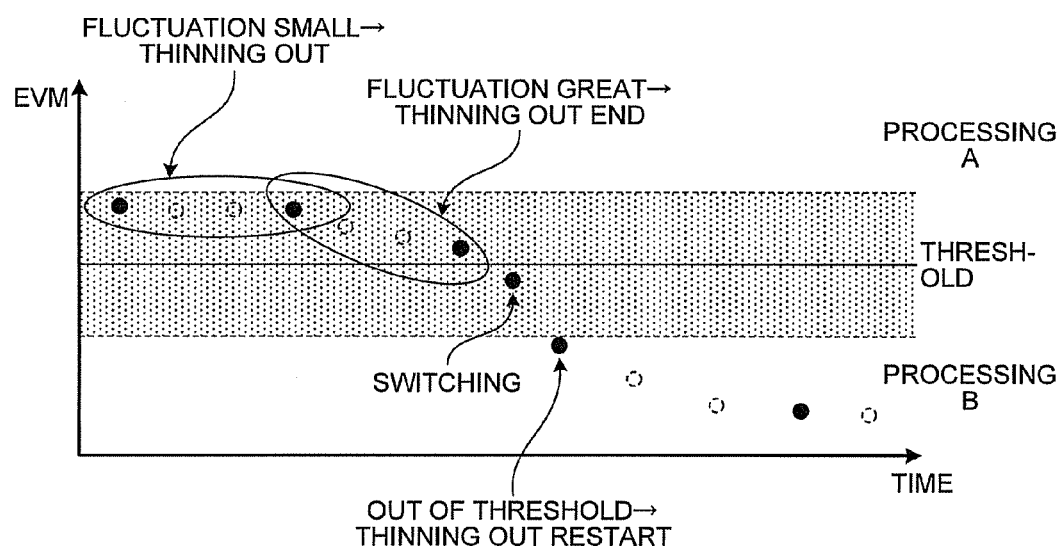
FIG. 8 is a view for use in describing the determination in a control unit of the third embodiment.

One example of the specific operational difference will be shown. FIG. 8 is a view for use in describing the determination in the control unit 102a of the embodiment. As illustrated in FIG. 6, in the case of not using the root mean square, the threshold determining unit 402 determines not to reduce the data when the input EVM value comes to the vicinity of the threshold for switching the operation, like the first and second embodiments. According to this, the calculation accuracy is raised but the power consumption is increased.

On the other hand, in the case of using the root mean square, the threshold determining unit 402 thins out (reduces) the data and performs the intermittent operation, when the root mean square value is small (error fluctuation is small) even when the EVM value is in the vicinity of the threshold, and it determines not to thin out (reduce) the data when the root mean square value is large (error fluctuation is great), as illustrated in FIG. 8. According to this control, deterioration in the EVM accuracy is restrained to the minimum while saving the power consumption.

The following operations are the same as those in the second embodiment. Based on the result determined by the clock control determining unit 201a, the clock control signal creating unit 202a creates a clock gating determination signal as the data reduction determination signal and supplies it to the clock control unit 203. Although the case of using the gating is used by way of example, dividing may be used as described in the second embodiment.

The clock control unit 203 creates a clock signal (EVM calculating unit control signal) for controlling a clock to be supplied to the EVM calculating unit 101a, according to the clock gating determination signal from the clock control signal creating unit 202a and supplies this signal to the EVM calculating unit 101a and the root mean square calculating unit 401.

The root mean square calculating unit 401 does not use a clock signal for calculation of the root mean square; however, only when receiving a clock signal, it can perform the calculation. According to this, further power consumption can be saved.

Although in this embodiment, root mean square is used for checking the fluctuation, it is not restricted to this. The other index may be used as far as it can check the fluctuation.

As set forth hereinabove, according to this embodiment, EVM root mean square is further used, and even when the EVM value is stable in the vicinity of the threshold, data reduction is performed. According to this, compared with the first and second embodiments, power consumption can be further saved.

According to the first and second embodiments, by properly switching the frequency of EVM calculation depending on the state of the EVM value (state of the transmission channel), power consumption can be saved. Detailed calculation is performed in the vicinity of the threshold where the switching should be performed, while the frequency of EVM calculation is reduced by thinning out the data in the area not involving the switching. This can save the power consumption better than the constant monitoring (constant calculation of the EVM value) and the switching can be performed in every application more accurately than the simple thinning out.

Further, according to the third embodiment, by monitoring the fluctuating of the EVM value, the frequency of calculation necessary for calculating the EVM value can be reduced even in a situation having little fluctuating. These two operations can save the power consumption while sustaining the deterioration in the accuracy of the EVM calculation.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A receiver comprising:
   an EVM calculating unit configured to calculate an EVM (Error Vector Magnitude) value of an input signal;
   a control unit configured to determine whether a frequency of EVM calculation is reduced or not, according to a comparison between the EVM value and a predetermined range including a threshold for switching processing by the EVM value; and
   a data reducing unit configured to control a calculation interval of the EVM value in the EVM calculating unit, according to the determination result by the control unit.

2. The receiver according to claim 1, wherein the EVM calculating unit calculates an EVM value from one data of the input signal.

3. The receiver according to claim 1, wherein the EVM calculating unit calculates an EVM value from a plurality of data of the input signal.

4. The receiver according to claim 1, wherein the predetermined range is defined as a range having vertically same spaces around the threshold.

5. The receiver according to claim 1, wherein in the predetermined range, an upper space on the threshold is different from a lower space under the threshold in size.

6. The receiver according to claim 1, wherein the control unit determines whether the frequency of EVM calculation is reduced or not, with respect to a plurality of thresholds.

7. A receiver comprising:
   an EVM calculating unit configured to calculate an EVM (Error Vector Magnitude) value of an input signal;
   a control unit configured to determine whether a frequency of EVM calculation is reduced or not, according to a comparison between the EVM value and a predetermined range including a threshold for switching processing by the EVM value; and
   a data reducing unit configured to control a calculation interval of the EVM value in the EVM calculating unit, according to the determination result by the control unit, wherein
   the control unit includes
   a clock control determining unit configured to determine whether the frequency of the EVM calculation is reduced or not, according to a comparison between the EVM value and the predetermined range; and
   a clock control signal creating unit configured to create a clock control signal for controlling a clock for the EVM calculating unit and supply the clock control signal, according to the determination by the clock control determining unit,
   the data reducing unit includes
   a clock control unit configured to create a clock signal based on the clock control signal and supply the clock signal to the EVM calculating unit, and
   the EVM calculating unit calculates the EVM value according to the supplied clock signal.

8. The receiver according to claim 7, wherein the clock control determining unit determines to calculate a next EVM value at a predetermined interval, without reducing the frequency of calculation in the EVM calculating unit, when the EVM value is within the predetermined range, while when the EVM value is out of the predetermined range, the EVM calculating unit reduces the frequency of the calculation and the clock control determining unit determines to calculate the next EVM value at a longer interval than the predetermined interval.

9. The receiver according to claim 7, wherein
the EVM calculating unit calculates an EVM value from one data of the input signal.

10. The receiver according to claim 7, wherein
the EVM calculating unit calculates an EVM value from a plurality of data of the input signal.

11. The receiver according to claim 7, wherein
the predetermined range is defined as a range having vertically same spaces around the threshold.

12. The receiver according to claim 7, wherein
in the predetermined range, an upper space on the threshold is different from a lower space under the threshold in size.

13. The receiver according to claim 7, wherein
the clock control determining unit determines whether the frequency of the EVM calculation is reduced or not, with respect to a plurality of thresholds.

14. A receiver comprising:
an EVM calculating unit configured to calculate an EVM (Error Vector Magnitude) value of an input signal;
a control unit configured to determine whether a frequency of EVM calculation is reduced or not, according to a comparison between the EVM value and a predetermined range including a threshold for switching processing by the EVM value;
a data reducing unit configured to control a calculation interval of the EVM value in the EVM calculating unit, according to the determination result by the control unit; and
a root mean square calculating unit configured to calculate root mean square of the EVM value, wherein
the control unit includes
a clock control determining unit configured to determine whether the frequency of the EVM calculation is reduced or not, according to a comparison between the EVM value and the predetermined range and according to the root mean square; and a clock control signal creating unit configured to create a clock control signal for controlling a clock for the EVM calculating unit and supply the clock control signal, according to the determination by the clock control determining unit, the data reducing unit includes
a clock control unit configured to create a clock signal based on the clock control signal and supply the clock signal to the EVM calculating unit, and
the EVM calculating unit calculates the EVM value according to the supplied clock signal.

15. The receiver according to claim 14, wherein
the clock control determining unit
determines to calculate a next EVM value at a predetermined interval, without reducing the frequency of calculation in the EVM calculating unit, when the EVM value is within the predetermined range and the EVM value fluctuates greatly from the root mean square, while
when the EVM value is out of the predetermined range, or when the EVM value is within the predetermined range and the EVM does not fluctuate much from the root mean square, the EVM calculating unit reduces the frequency of the calculation and the clock control determining unit determines to calculate the next EVM value at a longer interval than the predetermined interval.

16. The receiver according to claim 14, wherein
the EVM calculating unit calculates an EVM value from one data of the input signal.

17. The receiver according to claim 14, wherein
the EVM calculating unit calculates an EVM value from a plurality of data of the input signal.

18. The receiver according to claim 14, wherein
the predetermined range is defined as a range having vertically same spaces around the threshold.

19. The receiver according to claim 14, wherein
in the predetermined range, an upper space on the threshold is different from a lower space under the threshold in size.

20. The receiver according to claim 14, wherein
the clock control determining unit determines whether the frequency of the EVM calculation is reduced or not, with respect to a plurality of thresholds.

* * * * *